United States Patent
Kashiwagi et al.

(10) Patent No.: US 8,888,151 B2
(45) Date of Patent: Nov. 18, 2014

(54) VEHICLE BODY REAR STRUCTURE

(71) Applicant: Honda Motor Co., Ltd., Tokyo (JP)

(72) Inventors: Masakazu Kashiwagi, Wako (JP); Norikazu Matsuura, Wako (JP); Hiroyoshi Watanabe, Tochigi (JP); Ryota Tanabe, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/897,665

(22) Filed: May 20, 2013

(65) Prior Publication Data

US 2013/0313840 A1 Nov. 28, 2013

(51) Int. Cl.
*B60R 19/34* (2006.01)

(52) U.S. Cl.
CPC .................................. *B60R 19/34* (2013.01)
USPC ...................... 293/133; 296/187.11

(58) Field of Classification Search
USPC ............. 296/187.09, 187.1, 187.11; 293/133, 293/154; 188/377
See application file for complete search history.

(56) References Cited

U.S. PATENT DOCUMENTS

| | | | |
|---|---|---|---|
| 4,950,031 A | 8/1990 | Mizunaga et al. | |
| 6,808,215 B2* | 10/2004 | Sakuma et al. | 293/102 |
| 8,297,668 B2* | 10/2012 | Nakanishi et al. | 293/132 |
| 8,496,287 B2* | 7/2013 | Matsuura et al. | 296/187.09 |
| 2005/0077739 A1* | 4/2005 | Vismara et al. | 293/133 |
| 2006/0290150 A1* | 12/2006 | Roll et al. | 293/133 |
| 2007/0181393 A1* | 8/2007 | Suzuki | 188/377 |
| 2010/0102592 A1* | 4/2010 | Tyan et al. | 296/187.09 |
| 2010/0127531 A1* | 5/2010 | Yasuhara et al. | 296/187.09 |
| 2012/0104778 A1* | 5/2012 | Mana et al. | 293/133 |
| 2013/0207417 A1* | 8/2013 | Kihara et al. | 296/187.09 |
| 2013/0300138 A1* | 11/2013 | Banasiak et al. | 293/133 |

FOREIGN PATENT DOCUMENTS

| | | |
|---|---|---|
| DE | 3822585 | 1/1989 |
| EP | 1522464 | 4/2005 |
| FR | 2977222 | 1/2013 |
| JP | 2002-331962 | 11/2002 |
| JP | 2006-341677 | 12/2006 |
| JP | 2007-261557 | 10/2007 |
| JP | 2008-062695 | 3/2008 |

OTHER PUBLICATIONS

European Search Report dated Sep. 5, 2013, Application No. 13168719.6, 8 pages.
Japanese Office Action dated Mar. 18, 2014, 3 pages.

* cited by examiner

*Primary Examiner* — Jason S Morrow
(74) *Attorney, Agent, or Firm* — Rankin, Hill & Clark LLP

(57) ABSTRACT

A collision load is appropriately absorbed even in a case that the collision load is intersectionally input from the oblique rear with respect to the vehicle longitudinal direction. Plural first to sixth corner portions provided at the rear end of an extension are arranged such as to be located at respective different positions along the vehicle longitudinal direction, wherein the first corner portion located at the vehicle transverse inner upper end is located the rearmost, and wherein the first to sixth corner portions and first to sixth edge lines, which form the rear end of the extension, are provided such as to be located at the rear in a spiral form from the first corner portion toward the vehicle front in order.

3 Claims, 12 Drawing Sheets

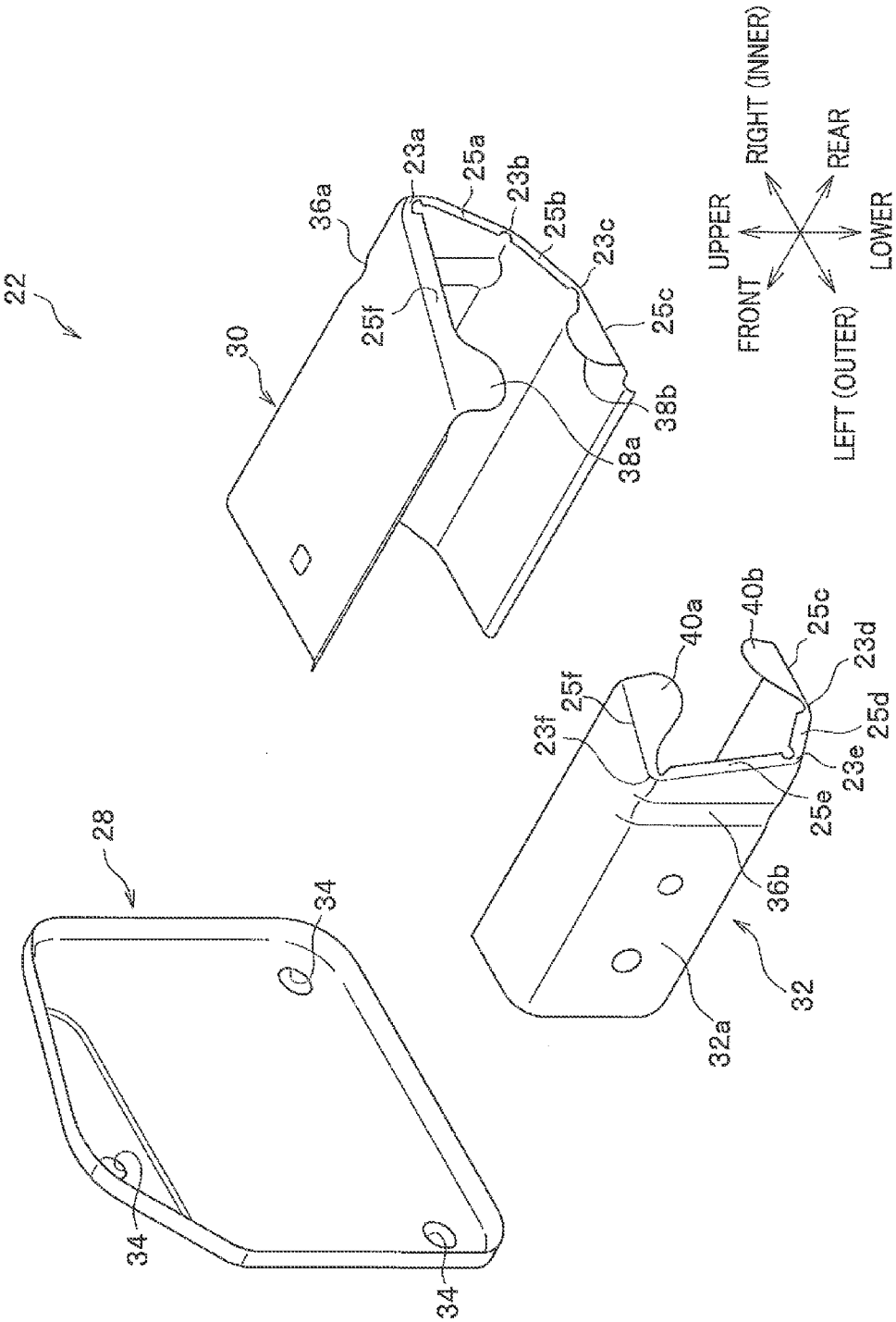

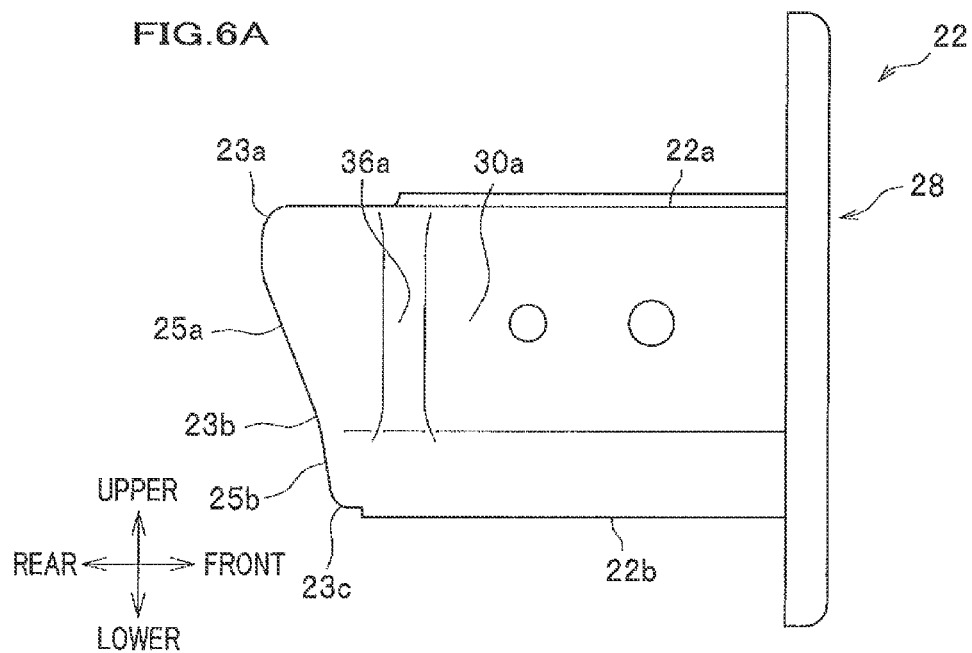
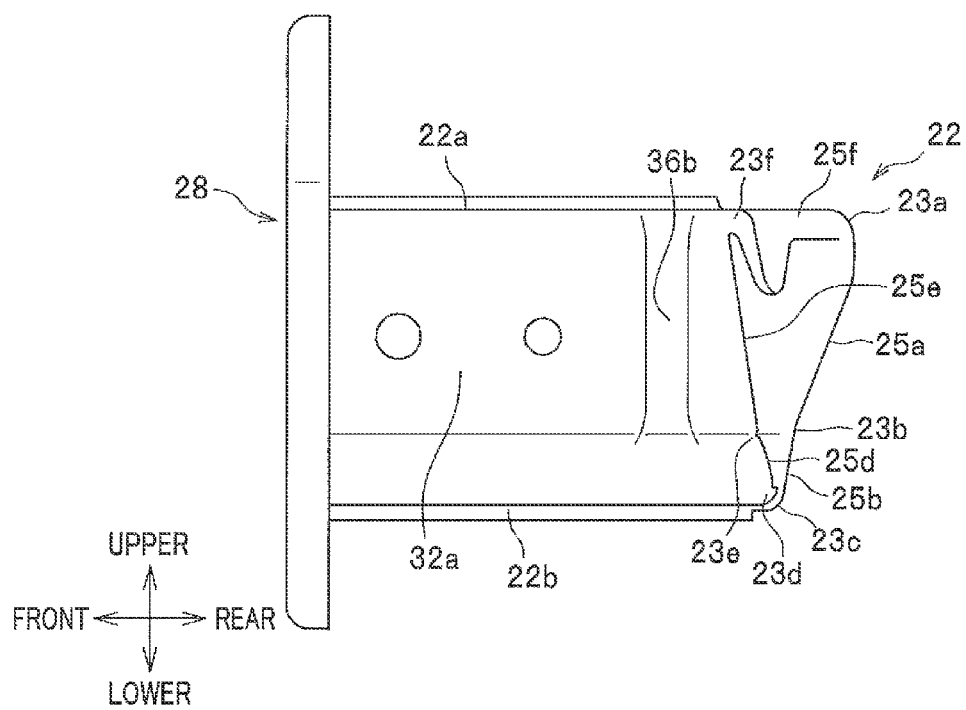

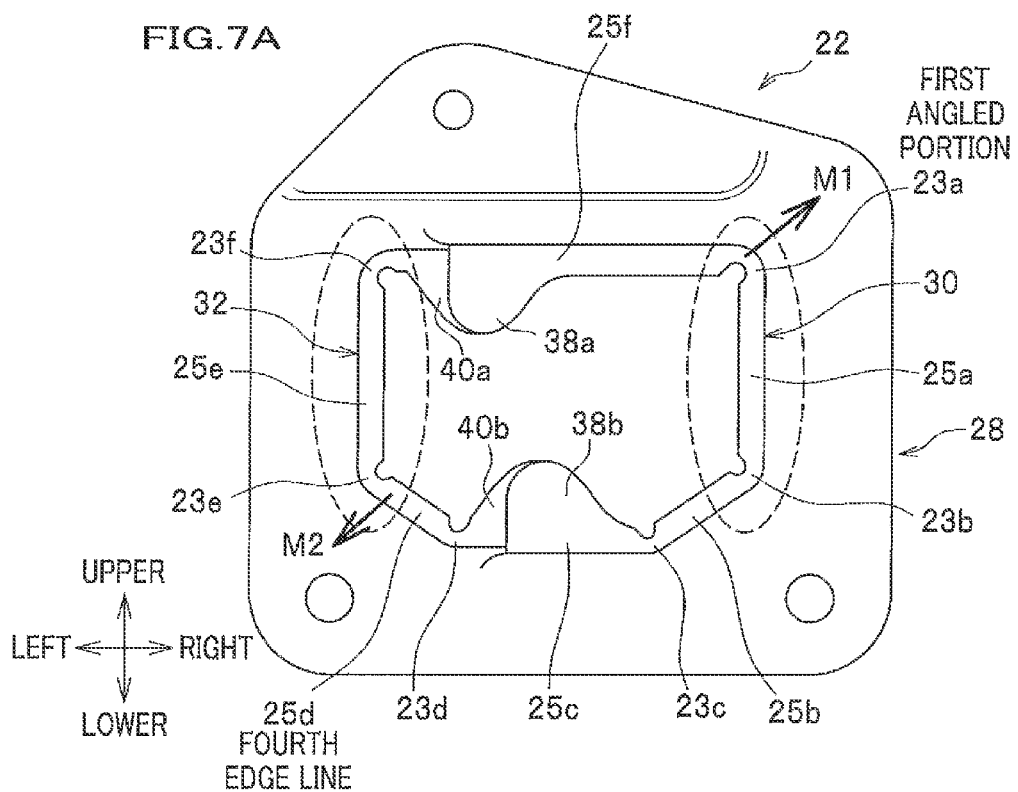
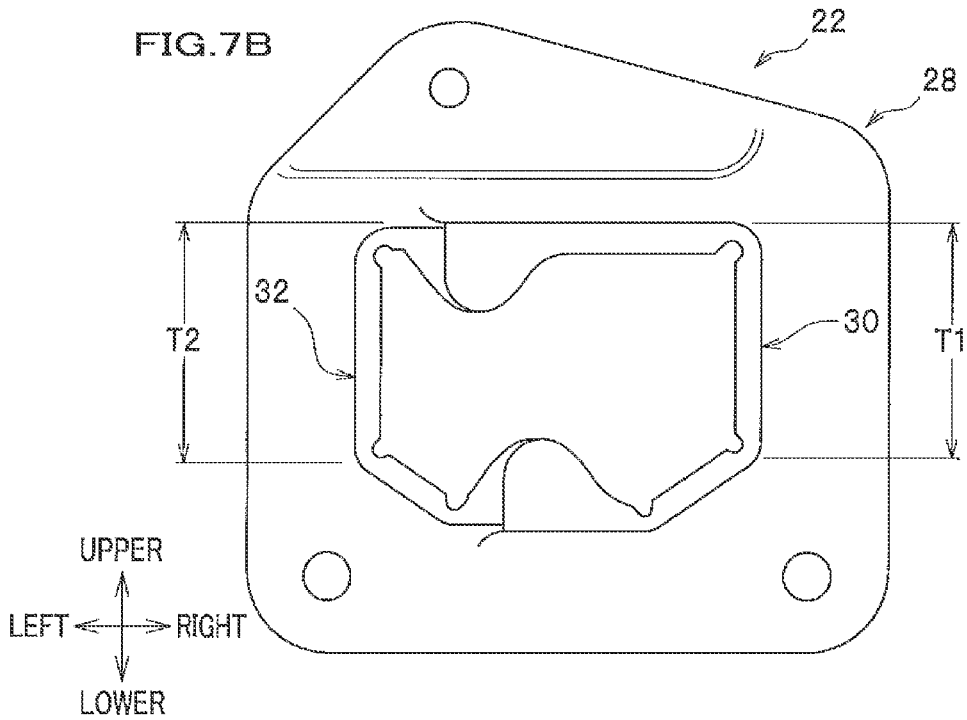

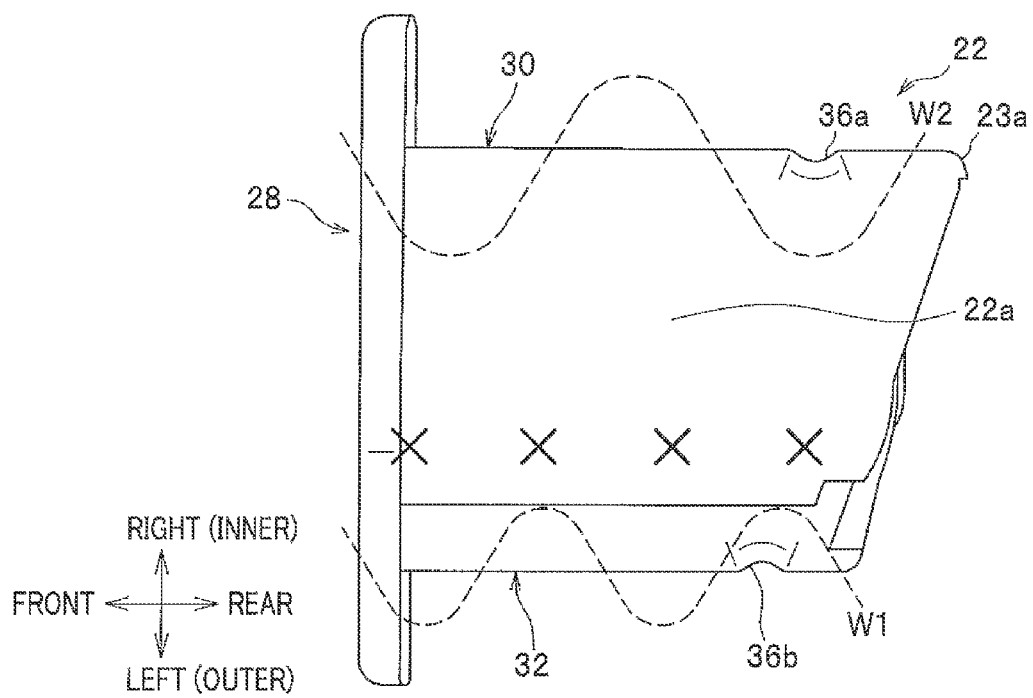
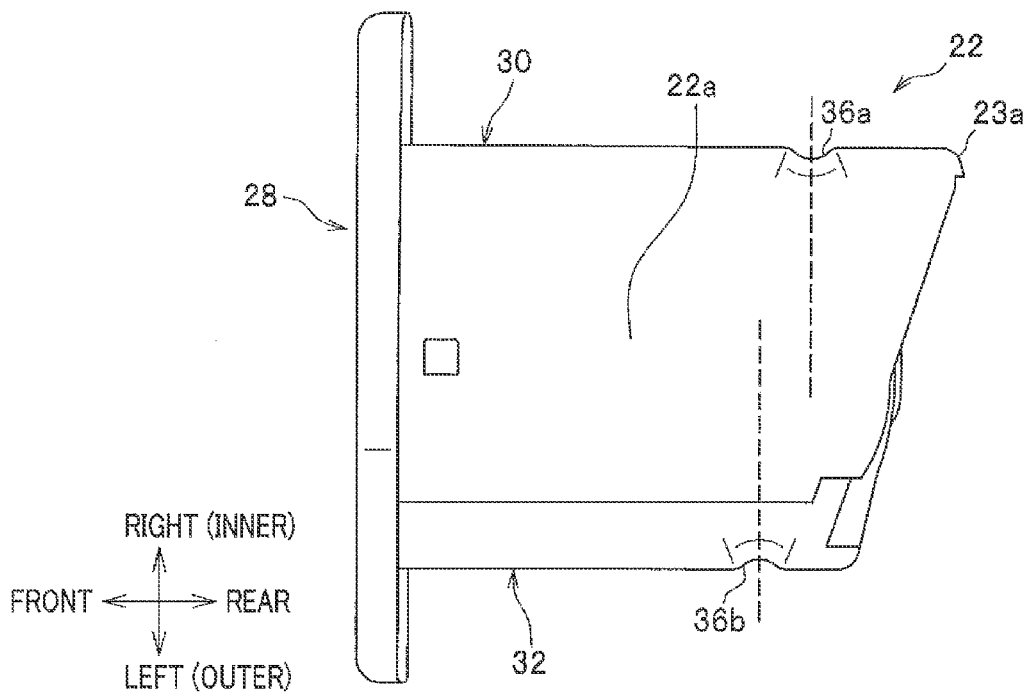

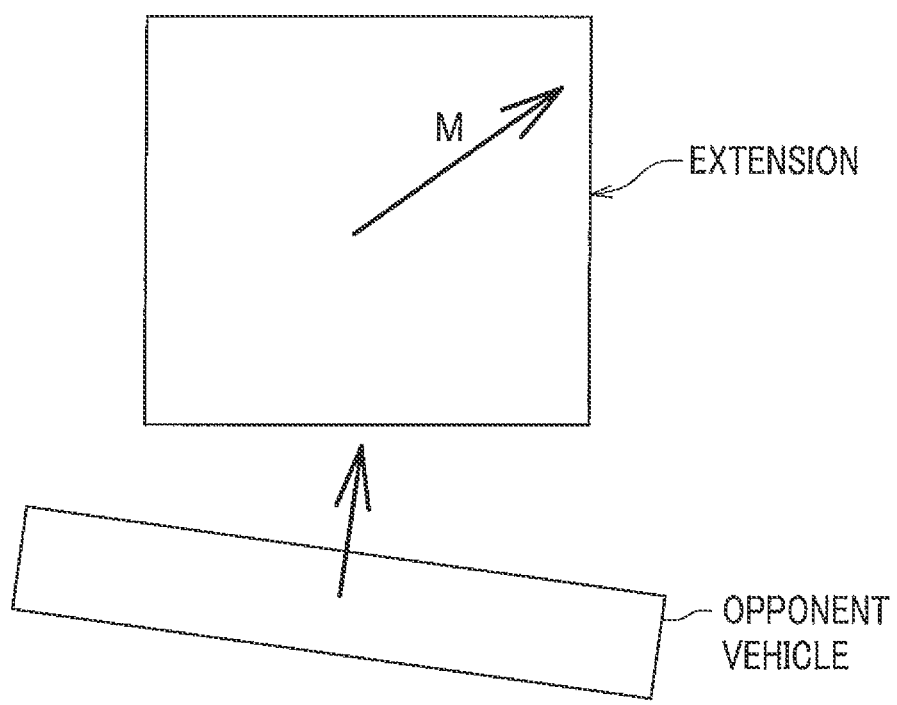

VEHICLE BODY REAR STRUCTURE

CROSS REFERENCE TO RELATED APPLICATION

This application claims the priority of Japanese Patent Application No. 2012-116308, filed on May 22, 2012, the entire specification, claims and drawings of which are incorporated herewith by reference.

BACKGROUND OF THE INVENTION

1. Field of the Invention

The present invention relates to a vehicle body rear structure, and particularly relates to a vehicle body rear structure including plural frame members extending along the vehicle longitudinal direction and shock absorbing members provided at positions corresponding to the rear ends of these frame members.

2. Description of the Related Art

As a conventional vehicle body rear structure, there are presented various proposals for protecting a vehicle interior and absorbing a rear end collision load when a rear end collision has occurred on a vehicle body. For example, adopted is a structure in which a bumper beam is arranged at the rear positions of rear side frames through extensions. Such a structure is arranged such that a bumper beam and extensions absorb a collision load applied from the rear side when a light collision has occurred.

As this kind of vehicle body rear structure, for example, JP 2002-331962 A discloses a structure in which bumper stays 2 (extensions), which are shock absorbing members, are provided such as to protruding vehicle backward from a rear end cross-member 1 connected with the lower end portion of a rear bumper (see FIG. 14).

SUMMARY OF THE INVENTION

However, for example, there is a case that a bumper beam is not arranged at the rear portion of a vehicle due to restriction by vehicle design or for attaining weight reduction of the vehicle, and there is also a case that only a bumper beam with a low rigidity can be arranged for a small type of a vehicle. In such a case, it is necessary to appropriately crush a bumper stays 2 (extensions) in order to appropriately absorb a collision load applied from the rear side to a vehicle body. Particularly, when a collision load F is input from the oblique rear with respect to the vehicle longitudinal direction, the bumper stays 2 (extensions) tend to fall down toward inside the vehicle, and an expected collision load F can be hardly absorbed.

The present invention has been developed in the above-describe point of view, and an object of the invention is to provide a vehicle body rear structure capable of appropriately absorbing a collision load even in a case that a collision load is intersectionally input from the oblique rear with respect to the vehicle longitudinal direction.

In order to achieve the above-described object, in an aspect of the invention, a vehicle body rear structure includes: plural frame members extending along a vehicle longitudinal direction; and shock absorbing members provided at positions corresponding to rear ends of the respective frame members, wherein the each shock absorbing member is formed such that plural corner portions provided at a rear end of the shock absorbing member are located at positions different from each other along the vehicle longitudinal direction.

According to this aspect of the invention, as the plural corner portions of a shock absorbing member are arranged at respective different positions along the vehicle longitudinal direction, it is possible to inhibit inward falling of the entire shock absorbing member by making the pitches (wave widths) of vehicle transverse inner and vehicle transverse outer buckling waveforms of the shock absorbing member different from each other at the time of a collision from the vehicle rear and particularly from the oblique rear. Thus, it is possible to realize appropriate absorbing of a collision load, by axial crushing of the shock absorbing member.

Further, in another aspect of the invention, a corner portion located at a vehicle transverse inner upper end is located the rearmost of the plural corner portions provided at the rear end of the each shock absorbing member.

According to this aspect of the invention, as the corner portion located at the vehicle transverse inner upper end is located the rearmost of the plural corner portions provided at the rear end of the each shock absorbing member, it is possible to inhibit inward falling of the entire shock absorbing member by making the pitches (wave widths) of vehicle transverse inner and vehicle transverse outer buckling waveforms of the shock absorbing member different from each other at the time of a collision from the vehicle rear and particularly from the oblique rear. Thus, it is possible to an even greater extent to realize appropriate absorbing of a collision load, by axial crushing of the shock absorbing member.

Further, in still another aspect of the invention, the plural corner portions provided at the rear end of the each shock absorbing member are formed such as to be located in a spiral form from a vehicle inner upper end toward a vehicle front.

According to this aspect of the invention, the plural corner portions provided at the rear end of the each shock absorbing member are formed such as to be located in a spiral form from the vehicle inner upper end toward the vehicle front, and point contact with a member of an opponent vehicle is realized at the time of a collision from the vehicle rear, particularly a collision from the oblique rear, and the pitches (wave widths) of vehicle transverse inner and vehicle transverse outer buckling waveforms of the shock absorbing member are made different from each other so that inward falling of the shock absorbing member can be inhibited. Thus, in this aspect of the invention, it is possible to an even greater extent to realize appropriate absorbing of a collision load, by axial crushing of the shock absorbing member.

In yet another aspect of the invention, the each shock absorbing member is formed by plural members superimposed on each other along a vehicle transverse direction, wherein the plural members includes respective extended portions extended from rear ends thereof toward an inner side of the shock absorbing member, and wherein superimposed parts formed by superimposing the extended portions on each other are joined from a vehicle rear.

According to this aspect of the invention, the each shock absorbing member is formed by plural members superimposed on each other along the vehicle transverse direction, and extended portions extended from rear end toward the inner side of the shock absorbing member are superimposed and joined from the vehicle rear. Thus, the plural members forming the shock absorbing member are inhibited from separating from each other, which makes it unnecessary to fix the plural members, for example, by a different member. Thus, according to this aspect of the invention, the shock absorbing performance can be improved by utilizing the in-plane shear rigidity of the upper surface of the shock absorbing member, and the thickness of the shock absorbing member can be decreased compared with a conventional case so that weight reduction and manufacturing cost reduction can be attained.

In still another aspect of the invention, the each shock absorbing member is arranged such that a closed cross-section is formed by superimposing plural C-shaped members substantially in a C-shape in a side view on each other along a vehicle transverse direction, and that a width dimension, along a vehicle upper/lower direction, of a vertical wall of a C-shaped vehicle transverse inner member and a width dimension, along a vehicle upper/lower direction, of a vertical wall of a C-shaped vehicle transverse outer member are different from each other.

According to this aspect of the invention, the width dimension, along a vehicle upper/lower direction, of the vertical wall of the vehicle transverse inner member and the width dimension, along the vehicle upper/lower direction, of the vertical wall of the vehicle transverse outer member are different from each other, the inner and outer members forming the shock absorbing member, and thereby the pitches (wave widths) of the buckling waveforms of the vehicle transverse inner member and the vehicle transverse outer member of the shock absorbing member can be made different from each other. Thus, according to this aspect of the invention, the shock absorbing performance can be improved by utilizing the in-plane shear rigidity of the upper surface of the shock absorbing member, and the thickness of the shock absorbing member can be decreased so that weight reduction and manufacturing cost reduction can be attained.

In yet another aspect of the invention, the each shock absorbing member includes an inner notch formed on the vertical wall of the vehicle transverse inner member and extended along the vehicle upper/lower direction, and an outer notch formed on the vertical wall of the vehicle transverse outer member and extended along the vehicle upper/lower direction, wherein the inner notch and the outer notch are located at different positions along the vehicle longitudinal direction.

According to this aspect of the invention, the inner notch formed on the vertical wall of the vehicle transverse inner member and the outer notch formed on the vertical wall of the vehicle transverse outer member are located at respective different positions along the vehicle longitudinal direction, and thereby, the origin points of the vehicle transverse inner and the vehicle transverse outer buckling waveforms of the shock absorbing member are shifted from each other so that the entire shock absorbing member can be inhibited from inward falling. Thus, in this aspect of the invention, it is possible to appropriately absorb a collision load, by axial crushing of the shock absorbing member.

According to the present invention, it is possible to obtain a vehicle body rear structure capable of appropriate absorbing of a collision load even in a case that a collision load is intersectionally input from the oblique rear with respect to the vehicle longitudinal direction.

BRIEF DESCRIPTION OF THE DRAWINGS

FIG. 3 is an exploded perspective view of the extension shown in FIG. 1;

FIG. 6A is a side view of the extension shown in FIG. 5, and FIG. 6B is a side view of the extension in a view from the side opposite to the view in FIG. 6A;

FIG. 7A is an illustration showing a state that the moment that is input to the first corner portion at the rear end of the extension and the moment that is input to the fourth edge line are cancelled, and FIG. 7B is an illustration showing a state that the width dimension of the inner member and the width dimension of the outer member are different;

FIG. 8 is a plan view showing buckling waves occurring on the left and right sides of the extension;

FIG. 9 is a plan view showing an inner notch and an outer notch;

FIG. 11 is a schematic diagram showing a state that a collision load is applied to the extension from an oblique direction;

DETAILED DESCRIPTION OF THE PREFERRED EMBODIMENT

Figure 1:
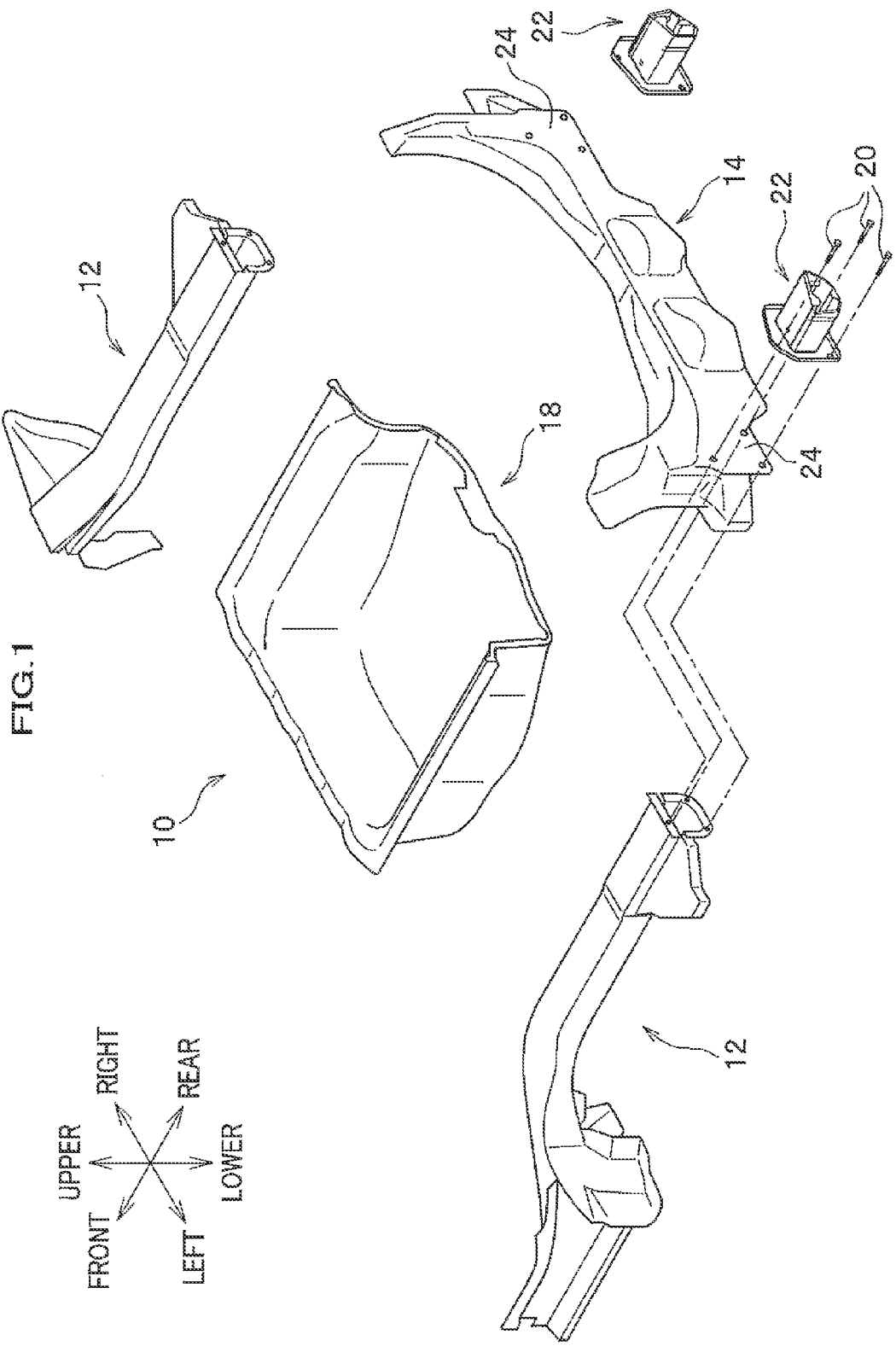
FIG. 1 is an exploded perspective view of the rear part of a vehicle body to which a vehicle body rear structure according to an embodiment of the invention is applied.

An embodiment according to the present invention will be described below in detail, referring to the drawings, as appropriate. FIG. 1 is an exploded perspective view of the rear part of a vehicle body to which a vehicle body rear structure according to an embodiment of the invention is applied. Incidentally, 'front/rear', 'left/right', and 'upper/lower' in respective figures respectively represent the vehicle longitudinal direction, the vehicle transverse direction (left/right direction), and the vehicle upper/lower direction.

As shown in FIG. 1, a vehicle body rear structure 10 includes left and right rear side frames (frame members) 12, 12 extending along the vehicle longitudinal direction, a rear panel 14 joined with the rear end portions of the left and right rear side frames 12, 12, the rear panel 14 extending along the vehicle transverse direction, and a cross-member, not shown, joined with the front end portions of the left and right rear side frames 12, 12, the cross-member extending along the vehicle transverse direction.

The vehicle body rear structure 10 is substantially in a rectangular shape in a plan view, and includes: a rear floor panel 18 whose four side portions are joined respectively with the left and right rear side frames 12, 12, the rear panel 14, and the cross member; and the left and right extensions (shock absorbing members) 22, 22 that are provided at positions corresponding to the rear ends of the left and right rear side frames 12, 12 and are fixed by being fastened to the rear panel 14 and the rear end portions of the left and right rear side frames 12, 12 together through plural bolts 20.

Figure 2:
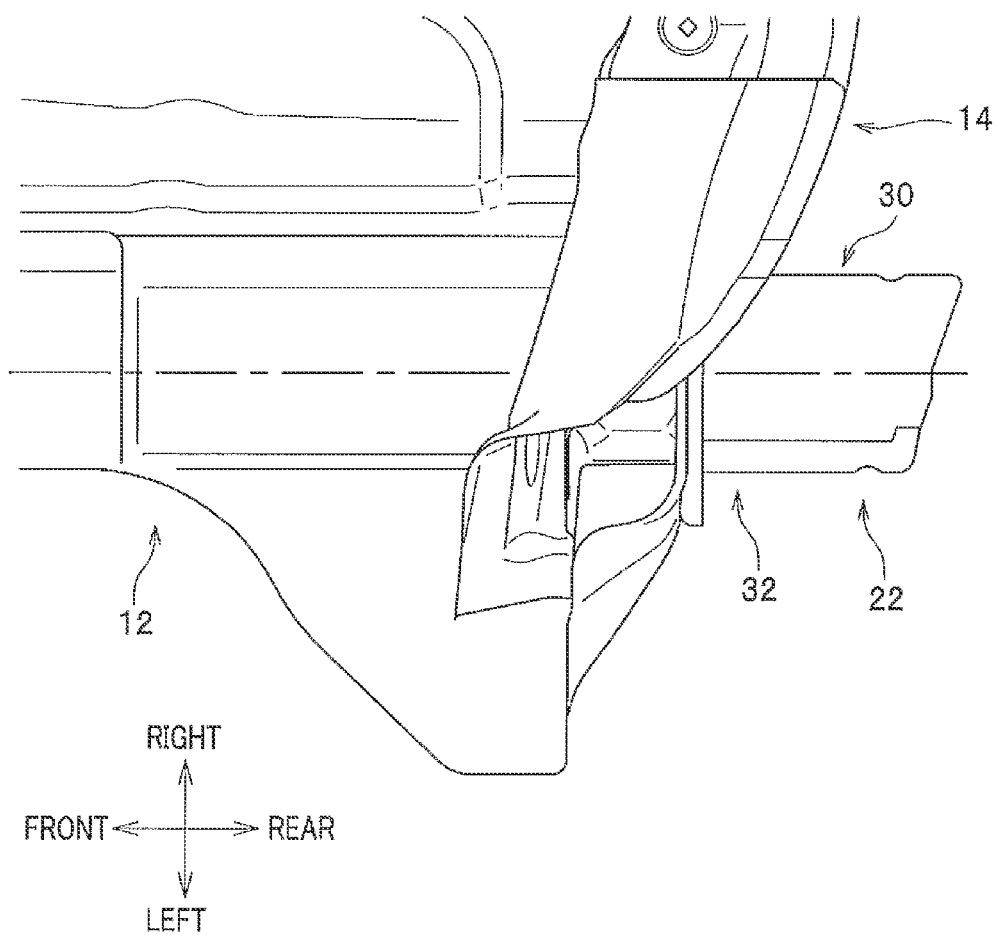
FIG. 2 is a plan view showing the position relationship between a rear side frame and an extension shown in FIG. 1.

The left and right extensions 22, 22 are, as shown in FIG. 2, disposed on the same axis as the left and right rear side frames 12, 12, and at positions posterior to the left and right rear side frames 12, 12. In FIG. 2, only the left rear side frame 12 and the left extension 22 are shown, and the right rear side frame 12 and the right extension 22 are omitted. Incidentally, as the left and right extensions 22, 22 are arranged symmetrically to each other, the left extension 22 will be described below in detail, while description on the right extension 22 will be omitted.

The extension 22 is, as shown in FIG. 3, formed by a plate 28 fastened by plural bolts 20 (see FIG. 1) to a flat surface 24 (see FIG. 1) on the end portion side along the axial direction (the vehicle transverse direction) of the rear panel 14, and an inner member 30 and an outer member 32 which are joined with the plate 28 by MIG welding for example. The plate 28, the inner member 30, and the outer member 32 are formed by press forming, namely performing pressure forming on a steel plate. Further, the inner member 30 and the outer member 32 are, as described later, integrally joined with each other by spot welding or the like, and thus form a tubular body. This tubular body forms a closed cross-section, which is perpendicular to the axial direction.

The plate 28 is provided with three bolt penetration holes 34. These bolt penetration holes 34 are formed in the respective vicinities of the corner portion on the upper side and the left and right corner portions on the lower side of the plate 28, which is substantially in a pentagonal shape in a front view. By fastening the margin of the plate 28 at three points by the bolts 20 (see FIG. 1), the extension 22 itself can be prevented from floating from the vehicle body (rear side frame 12).

Figure 4A:
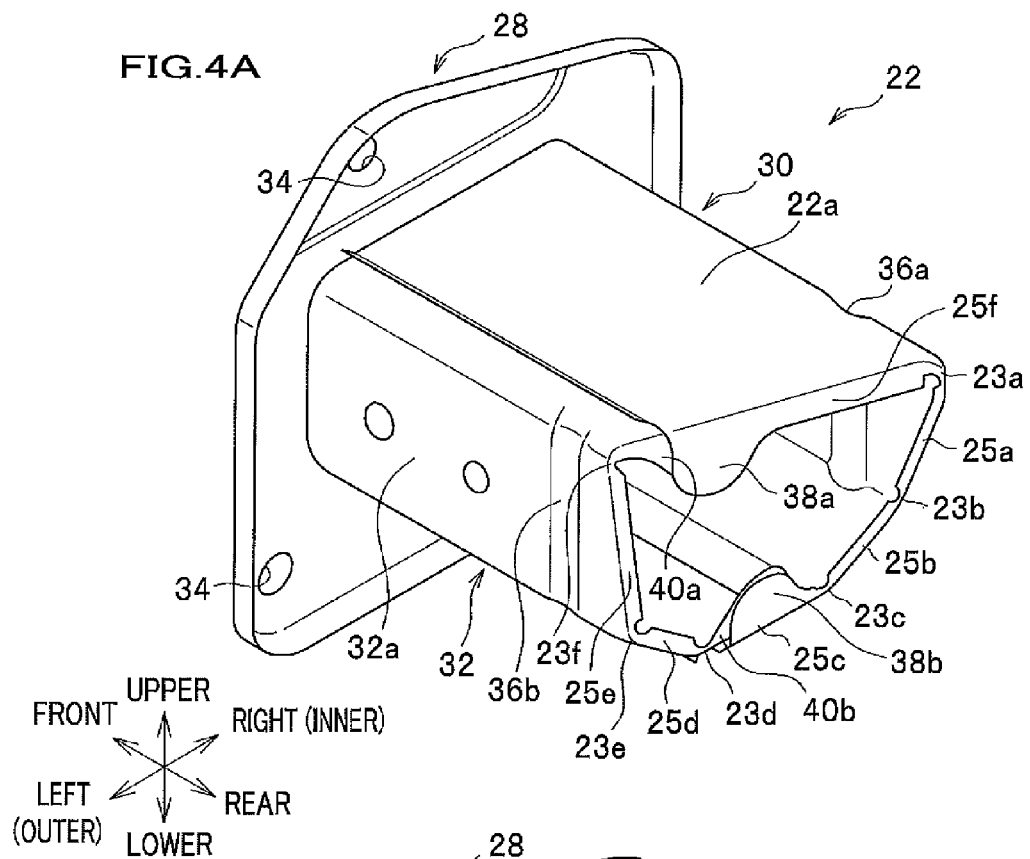
FIG. 4A is a perspective view of the extension.
Figure 4B:
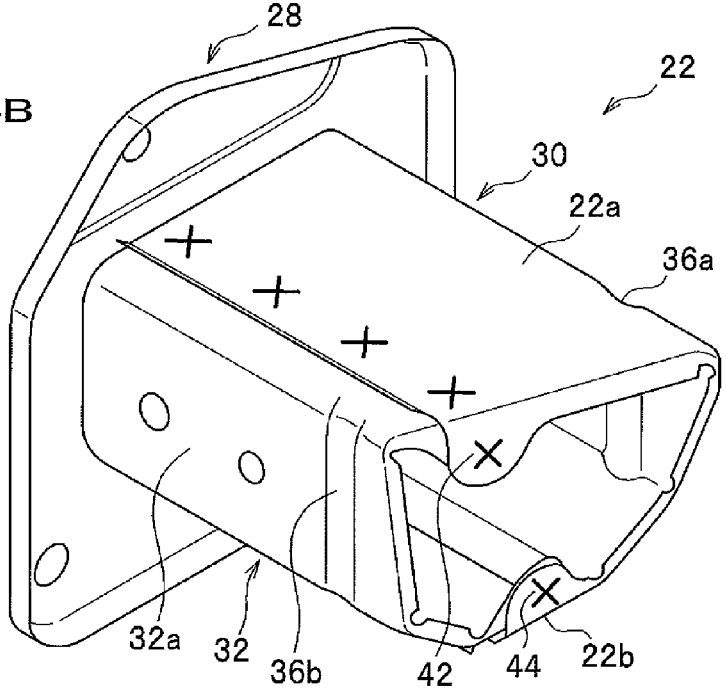
FIG. 4B is a perspective view showing the welded part of the extension.

The inner member 30 is disposed on the inner side along the vehicle transverse direction of the extension 22. The outer member 32 is disposed on the outer side along the vehicle transverse direction of the extension 22. The inner member 30 and the outer member 32 are C-shaped members with a C-shaped cross-section (in a side view) perpendicular to the axial direction, and are integrally joined with each other by fitting the two C-shaped members to each other along the vehicle transverse direction and spot welding the superimposed parts of the upper surface 22a and the lower surface 22b (see FIG. 4B).

In this case, each one of the superimposed parts of the upper surface 22a and the lower surface 22b is spot-welded, for example at four points (see FIG. 4B), and these points are set to positions that are substantially at the peak positions of the buckling waveform W1 of the outer member 32 at the time of a collision (see FIG. 8). Further, the spot-welded part of the upper surface 22a is provided at a position deviated from the center position of the upper surface 22a along the vehicle transverse direction to the outer member 32 side. Thus, by inhibiting an increase in the shear displacement at the buckling waveform W1 of the upper surface 22a of the extension 22, it is possible to effectively use the shear rigidity inside the upper surface 22a of the extension 22 at the time of a collision.

The tubular body of the extension 22 is formed with a substantially hexagonal vertical cross-section (see FIG. 7B) perpendicular to the axial direction (vehicle longitudinal direction). Further, as shown in FIGS. 4A to 6B, the rear end of the tubular body of the extension 22 has the first to sixth corner portions 23a to 23f, and the first to sixth edge lines 25a to 25f connecting the corner portions to each other. These first to sixth corner portions 23a to 23f, or both the first to sixth edge lines 25a to 25f that connect the neighboring corner portions with each other and the first to sixth corner portions 23a to 23f, are set to positions different from each other along the longitudinal vehicle direction.

Further, among the first to sixth corner portions 23a to 23f and the first to sixth edge lines 25a to 25f arranged at the rear end of the extension 22, the first corner portion 23a located at the upper end on the vehicle transverse inner side is located at the rearmost position (see FIG. 6A). Further, the first to sixth corner portions 23a to 23f and the first to sixth edge lines 25a to 25f, which are arranged at the rear end of the extension 22, are formed at positions located clockwise in a spiral form in an order from the first corner portion 23a located at the upper end on the vehicle inner side toward the vehicle front (see FIG. 6B).

Concretely, starting with the first corner portion 23a located at the upper end on the inner side of the vehicle, the rear end of the extension 22 is formed in the spiral form continuously clockwise in the order that is the first corner portion 23a→the first edge line 25a→the second corner portion 23b→the second edge line 25b→the third corner portion 23c→the third edge line 25c→the fourth corner portion 23d→the fourth edge line 25d→the fifth corner portion 23e→the fifth edge line 25e→the sixth corner portion 23f→the sixth edge line 25f→the first corner portion 23a. The corner portions and the edge lines are located at the vehicle rear in this order.

Incidentally, the right extension 22 is formed symmetrical to the left extension 22. Accordingly, the right extension 22 is different from the left extension 22 in that the first to sixth corner portions 23a to 23f and the first to sixth edge lines 25a to 25f, which are provided at the rear end of the right extension 22, are formed such as to be located in a spiral form counterclockwise in the order from the first corner portion 23a located at the upper end on the vehicle transverse inner side toward the vehicle front.

In such a manner, the positions, along the vehicle longitudinal direction, of the first to sixth corner portions 23a to 23f and the first to sixth edge lines 25a to 25f are shifted from each other such that these positions are different from each other along the vehicle longitudinal direction. By this arrangement, when a rear end collision has occurred, the vehicle comes in point contact with an opponent vehicle (described later).

In this case, the first corner portion 23a, the first corner portion 23a being at the upper end of the vehicle transverse inner wall 30a of the inner member 30 whose vertical wall has a length elongated along the axial direction (vehicle longitudinal direction), is located at a rearmost position. Regarding the outer member 32, the fourth edge line 25d, the fourth edge line 25d being the lower portion of the vehicle transverse outer wall 32a of the outer member 32 on the side diagonally opposite to the first corner portion 23a, is located at a rear position. By this arrangement, the opponent vehicle gradually contacts with the inner member 30 and the outer member 32 so that a moment M1 generated at the first corner portion 23a toward the vehicle transverse inner side, the first corner portion 23a being the upper end of the vehicle transverse inner wall 30a having firstly contacted with the opponent vehicle, is cancelled by a moment M2 generated at the fourth edge line 25d toward the vehicle transverse outer side, the fourth edge line 25d being the lower end portion of the vehicle transverse outer wall 32a having thereafter contacted with the opponent vehicle. Thus, the extension 22 can be stably crushed along the axis (see FIG. 7A). This point will be described later in detail.

In the present embodiment, the rear end of the extension 22 is formed substantially in a hexagonal shape, however, the invention is not limited thereto. It is necessary for a shock absorbing member like the extension 22 to appropriately generate a reaction force for absorbing a collision load, wherein a hexagonal shape or an octagonal shape in a cross-sectional view is, in general, preferable compared with a quadrangular shape. A collision load mainly flows along edge lines of a cross-sectional polygon, and in order to realize appropriate load distribution (load allocation) by the edge lines, the larger the number of vertexes (corner portions) is, the lower a load applied to one edge line is, and the collision stroke can be reduced.

Figure 5:
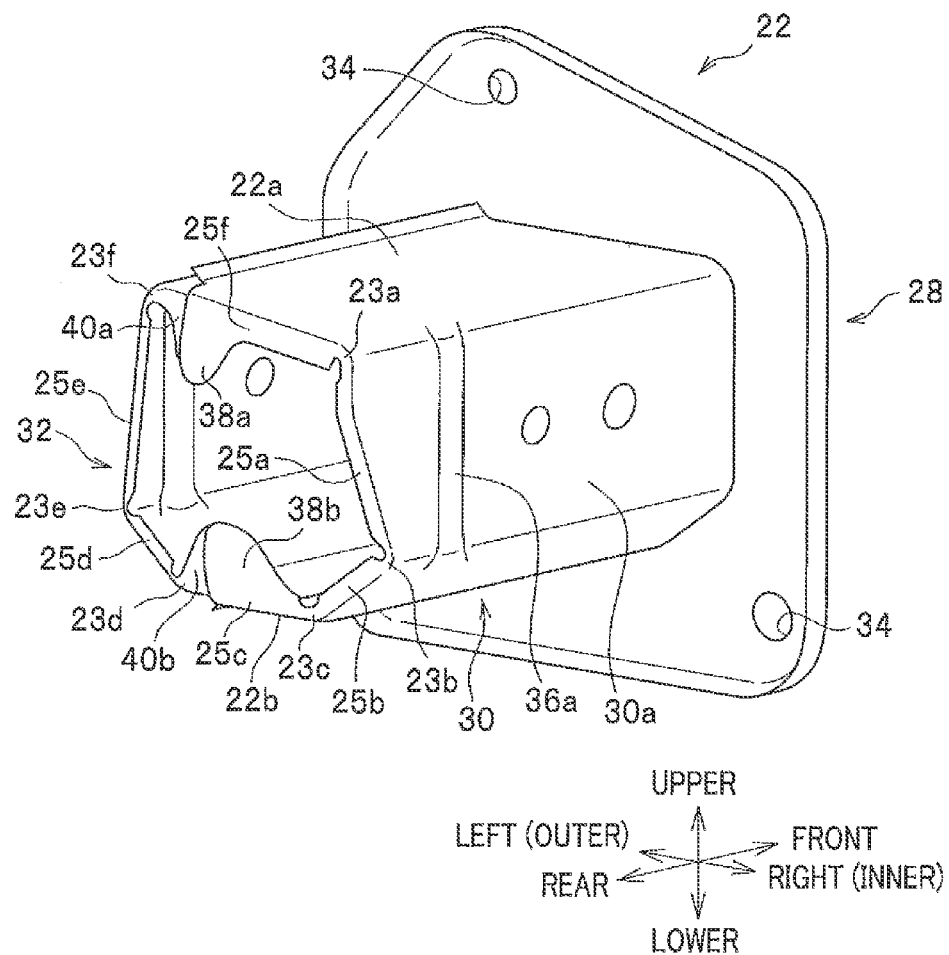
FIG. 5 is a perspective view of the extension in a view from the inner side along the vehicle transverse direction.

In order to prevent the rear end of the extension 22 from damaging other adjacent members and also to prevent opening between the inner member 30 and the outer member 32 (prevent separation between the superimposed parts of the inner member 30 and the outer member 32) at the time of a rear end collision, both the inner member 30 and the outer member 32 are bent to the inside of the extension 22 and welded with each other, and a burring process is also performed on the opening marginal portion on the side opposite to the side of joining with the plate 28 (see FIGS. 3 to 5). Incidentally, as a burring process is a known art, description of the burring process in detail will be omitted.

The pitch (wave width) of a buckling waveform is determined by the thicknesses, the dimensions of the top-bottom widths, the materials, etc. of the inner member 30 and the outer member 32 forming the extension 22. In the present embodiment, by making the width dimension T1 of the inner member 30 along the vehicle upper/lower direction and the width dimension T2 of the outer member 32 along the vehicle upper/lower direction different from each other (T1≠T2, T1<T2, see FIG. 7B), the pitches of the left/right buckling waveforms W1 and W2 of the inner member 30 and the outer member 32 are set to be different from each other (see FIG. 8). This is because, if the pitches of the left/right buckling waveforms W1 and W2 of the inner member 30 and the outer member 32 agree with each other, the material strength at positions along the vehicle longitudinal direction suddenly decreases and the entire extension 22 tends to fall down. Incidentally, the pitch of the buckling waveform W2 on the inner member 30 side is set larger than the pitch of the buckling waveform W1 on the outer member 32 side (pitch of W1<pitch of W2).

Further, by making the pitches of the left/right buckling waveforms W1, W2 different from each other, the shear rigidity of the upper surface 22a of the extension 22 can be effectively used against wrinkle formed on the upper surface 22a of the extension 22 at the time of crushing, and the thicknesses of the inner member 30 and the outer member 32 can be made small. In other words, by making the pitches of the left/right buckling waveforms W1, W2 different from each other, shear displacement is forcibly generated inside the upper surface 22a, and thus, the shear rigidity of the upper surface 22a of the extension 22 is effectively used. As a result, loads on the vehicle transverse inner wall 30a of the inner member 30 and the vehicle transverse outer wall 32a of the outer member 32 can be respectively divided, and the thickness can be made small compared with conventional cases.

Still further, in order to control the left/right buckling waveforms W1, W2, there are respectively provided an inner notch 36a and an outer notch 36b, which become the origin points of buckling over the entire top-bottom widths of the inner member 30 and the outer member 32 (see FIG. 8). The positions of the inner notch 36a and the outer notch 36b are set at the centers of the respective first waves, in a view from the vehicle rear, of the buckling waveforms W1, W2. The inner notch 36a is set posterior to the outer notch 36b along the vehicle longitudinal direction in a plan view so that the inner notch 36a buckles earlier than the outer notch 36b when a collision load is applied from a position posterior to the vehicle (see FIG. 9). Thus, crushing of the extension 22 can be stably carried out as described later.

In case of providing notches at positions after the first waveforms and particularly close to the root adjacent to the plate 28, the bearing force of the inner wall itself and/or the outer wall itself drops, and the entire extension 22 may fall down, wherein the root portion (the joint portion between the plate 28 and the inner member 30/outer member 32), where the moment is the largest, is the center of the fall.

Figure 10A:
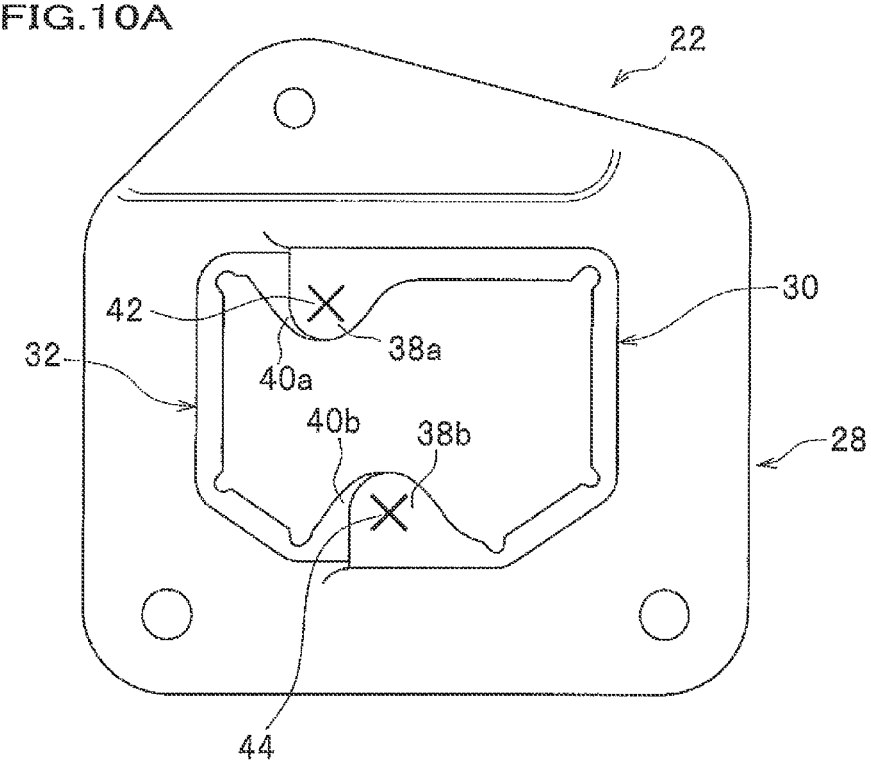
FIG. 10A is a side view of the extension in a view from the rear direction.
Figure 10B:
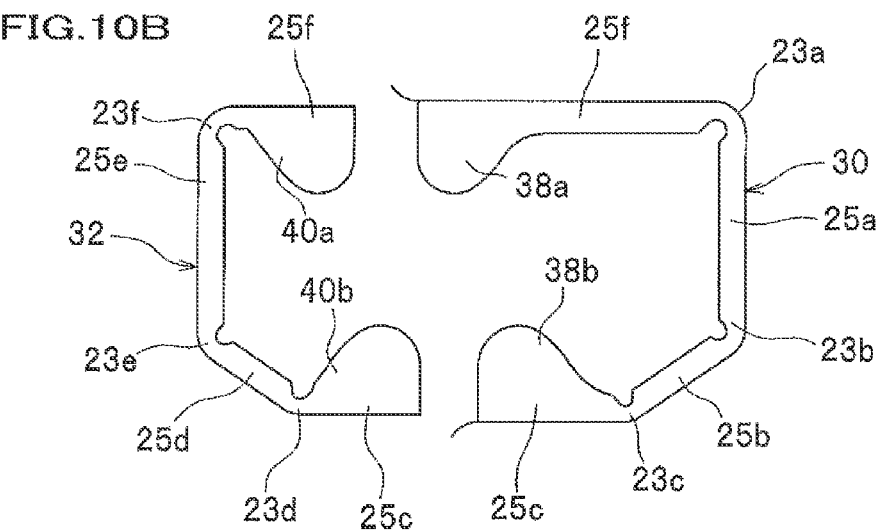
FIG. 10B is a side view of the inner member and the outer member in a view from the rear direction.

As shown in FIG. 10B, the rear end portion of the inner member 30 is provided with an upper tab 38a and a lower tab 38b (extended portions), which are bent toward the inside of the extension 22. The rear end portion of the outer member 32 is provided with an upper tab 40a and a lower tab 40b (extended portions), which are bent toward the inside of the extension 22. Herein, the upper tab 38a of the inner member 30 and the upper tab 40a of the outer member 32 are partially superimposed on each other and this superimposition part 42 is welded (spot welding). The lower tab 38b of the inner member 30 and the lower tab 40b of the outer member 32 are partially superimposed on each other and this superimposition part 44 is welded (spot welding) (see FIG. 10A). This welding is easily carried out from the vehicle rear.

By joining the upper tabs 38a, 40a with each other and the lower tabs 38b, 40b with each other in such a manner, opening between the inner member 30 and the outer member 32 at the time of a rear end collision can be inhibited. This is because, if the superimposition parts 42, 44 between the inner member 30 and the outer member 32 open and the inner member 30 and the outer member 32 separate from each other, the shear rigidity of the upper surface 22a of the extension 22 cannot be utilized, and an appropriate bearing force against a load cannot be obtained.

The vehicle body rear structure 10 in the present embodiment is structured basically as described above. The operation and advantages of the vehicle body rear structure 10 will be described below.

As shown in FIG. 11, in conventional cases, for example, when a rear end collision has occurred from the oblique rear, the opponent vehicle comes in contact with the left extension intersectionally from an oblique direction with respect to the vehicle longitudinal direction. As a collision load is input to the extension from the oblique direction, a moment M occurs toward the vehicle transverse inside, the entire extension falls down toward the vehicle transverse inside, and it is difficult to appropriately absorb the collision load.

Differently from this, in the present embodiment, the positions, along the vehicle longitudinal direction, of the first to sixth corner portions 23a to 23f and the first to sixth edge lines 25a to 25f are shifted from each other such that the first to sixth corner portions 23a to 23f provided at the rear end of the extension 22, or both the first to sixth edge lines 25a to 25f that connect the neighboring corner portions with each other and the first to sixth corner portions 23a to 23f, are located at positions different from each other along the vehicle longitudinal direction. By this arrangement, the vehicle comes in point contact with an opponent vehicle.

Figure 12A:
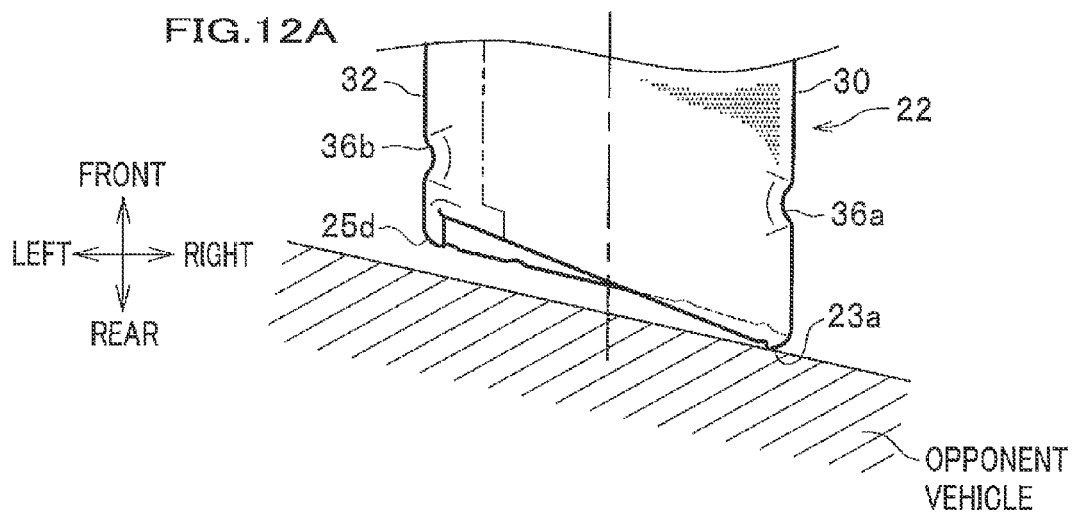
FIG. 12A to 12C are illustrations showing a state that a collision load is applied to the extension according to the present embodiment from an oblique rear direction and the extension buckles.
Figure 12B:
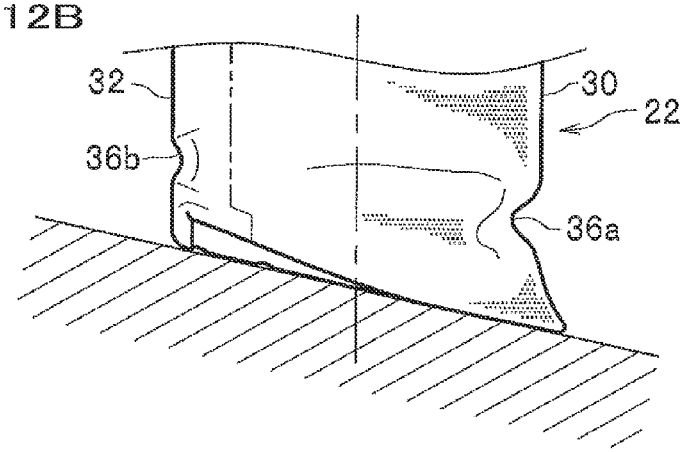
Figure 12C:
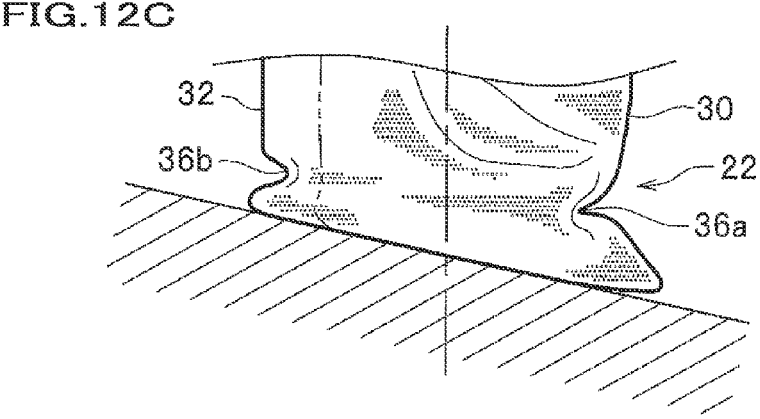

That is, the first corner portion 25a is the upper end of the vehicle transverse inner wall 30a of the inner member 30 elongated along the axial direction (vehicle longitudinal direction) of the vertical wall is located rearmost. Accordingly, the first corner portion 25a first comes in contact with the opponent vehicle upon a rear end collision with an opponent vehicle (light collision at the rear), and buckling occurs from the inner notch 36a as the origin point (see FIG. 12A). Subsequently, the fourth edge line 25d, which is the lower portion of the vehicle transverse outer wall 32a of the outer member 32 on the side diagonally opposite to the first corner portion 23a, comes in contact with the opponent vehicle, and buckling occurs from the outer notch 36b as the origin point (see FIG. 12B). As a result, the extension 22 gradually contacts with the opponent vehicle so that the moment M1 toward the vehicle transverse inside, the moment M1 having occurred at the first corner portion 23a being the upper end of the vehicle transverse inner wall 30a having first contacted with the opponent vehicle, is cancelled by the moment M2 toward the vehicle transverse outside, the moment M2 having occurred at the fourth edge line 25d being the lower portion of the vehicle transverse outer wall 32a having thereafter contacted the opponent vehicle (see FIG. 7A). Thus, the extension 22 can be stably crushed along the axis (see FIG. 12C).

Figure 13:
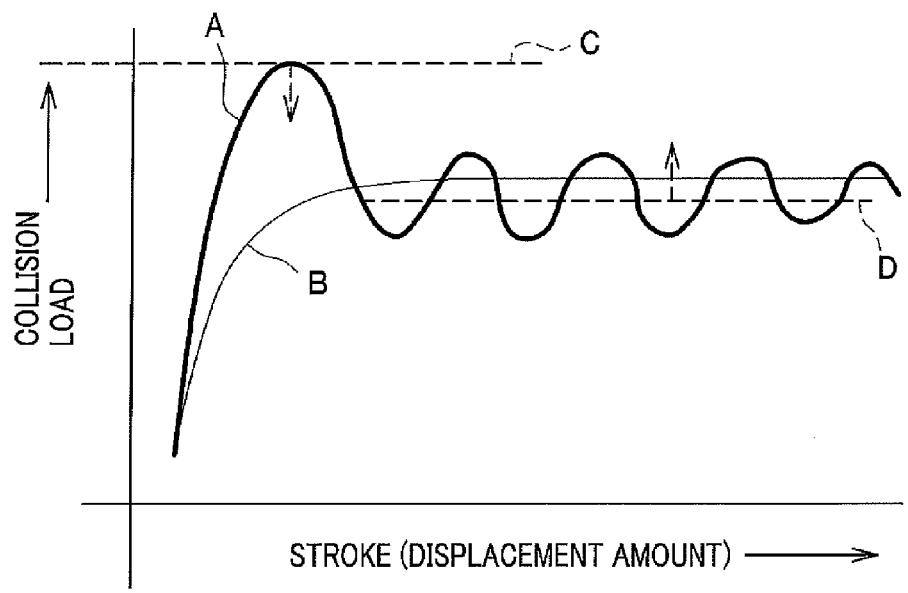
FIG. 13 is a characteristic diagram showing the relationship between the stroke and the collision load on the extension according to the present embodiment.
Figure 14:
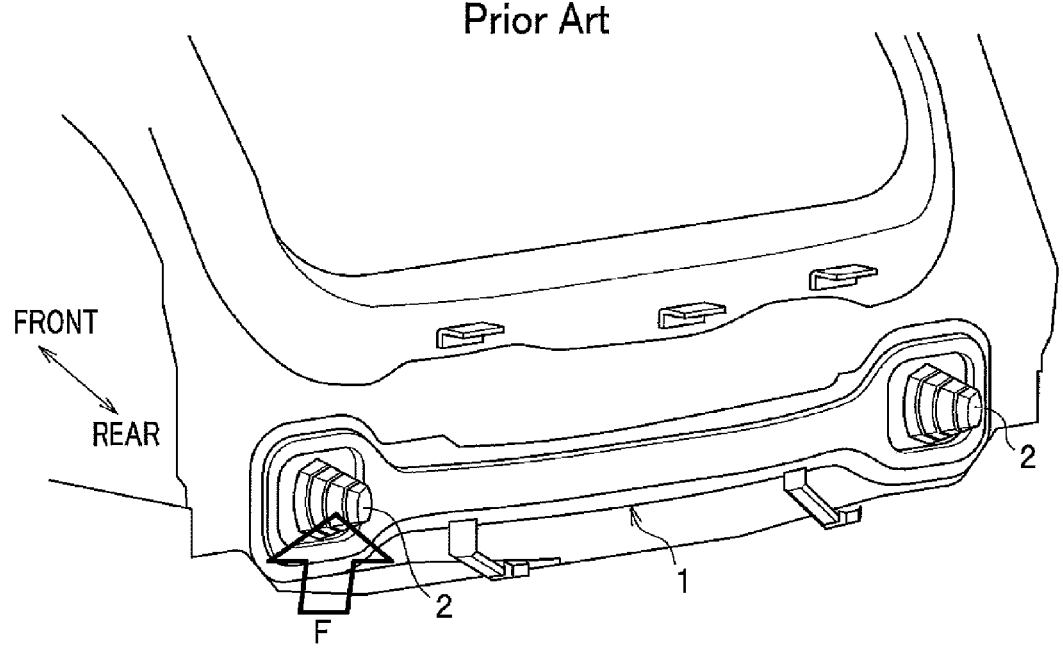
FIG. 14 is a perspective view showing the vehicle body rear structure in JP 2002-331962 A.

FIG. 13 shows a characteristic curve showing the relationship between the stroke and the collision load, at the time of crushing.

In FIG. 13, the characteristic curve A shown by a thick solid curve represents the relationship between the stroke and the collision load at the time of real crushing obtained by experiment or simulation. The characteristic curve B shown by the thin solid line represents an ideal relationship between the stroke and the collision load at the time of crushing. In the present embodiment, by setting the positions of the first to sixth corner portions 23a to 23f provided at the rear end of the extension 22 and the first to sixth edge lines 25a to 25f such as to be different along the vehicle longitudinal direction, a real characteristic curve A was successfully made close to an ideal characteristic curve B as much as possible.

Incidentally, in FIG. 13, the initial input load bearing force shown by a dashed line C is preferably made as low as possible. Thus, it is possible to make the extension 22 be easily crushed by an input of a load caused by a light collision to thereby sufficiently absorb the load so that deformation of other members is reduced without deforming the left and right rear side frames 12, 12.

In FIG. 13, the average of the input load bearing force during crushing of the extension 22 shown by a dashed line D is preferably made as high as possible. Thus, the load absorbing performance of the extension 22 can be improved, and the deformation of the left and right rear side frames 12, 12 can be reduced. Further, reduction in non-life insurance premium can be attained by reducing the repair cost.

In the present embodiment, as plural corner portions provided at the rear end of the extension (shock absorbing member) 22 are set at positions different from each other along the vehicle longitudinal direction, it is possible to inhibit inward falling of the entire extension 22 by making the pitches (wave widths) of vehicle transverse inner and vehicle transverse outer buckling waveforms W1, W2 of the extension 22 different from each other at the time of a collision from the vehicle rear and particularly from the oblique rear. Thus, in the present embodiment, even in a case that a bumper beam (not shown) is not arranged at the rear portion of a vehicle due to restriction by vehicle design or for attaining weight reduction of the vehicle, and in a case that only a bumper beam with a low rigidity can be arranged for a small type of a vehicle, appropriate absorbing of a collision load can be realized by axial crushing of the extension 22.

Further, in the present embodiment, the first edge line portion 23a located at the vehicle transverse inner upper end is located the rearmost of the plural corner portions at the rear end of the extension 22, and it is thereby possible to inhibit inward falling of the entire extension 22 by making the pitches (wave widths) of vehicle transverse inner and vehicle transverse outer buckling waveforms W1, W2 of the extension 22 different from each other at the time of a collision from the vehicle rear and particularly from the oblique rear. Thus, in the present embodiment, appropriate absorbing of a collision load can be realized by axial crushing of the extension 22.

Further, in the present embodiment, the plural corner portions at the rear end of the extension 22 are located in a spiral form, which is clockwise (for the left extension 22) or counterclockwise (for the right extension 22), in an order from the first edge line portion 23a being the vehicle transverse inner upper end toward the vehicle front. Thus, point contact with the front member of an opponent vehicle is realized at the time of a collision from the vehicle rear, particularly a collision from the oblique rear, and the pitches (wave widths) of vehicle transverse inner and vehicle transverse outer buckling waveforms W1, W2 of the extension 22 are made different from each other so that inward falling of the entire extension 22 can be inhibited. Thus, in the present embodiment, it is possible to an even greater extent to realize appropriate absorbing of a collision load, by axial crushing of the extension 22.

Still further, in the present embodiment, the extension 22 is formed by the inner member 30 and the outer member 32 superimposed with each other along the vehicle transverse direction. The superimposition parts 42, 44, which are respectively formed by superimposing the upper tabs (extended portions) 38a, 40a and superimposing the lower tabs (extended portions) 38b, 40b extended from the rear end toward the inside of the extension 22, are respectively joined from the vehicle rear. Accordingly, at the time of a collision from the vehicle rear, the inner member 30 and the outer member 32 forming the extension 22 are inhibited from separating from each other, which makes it unnecessary to fix the inner member 30 and the outer member 32, for example, by a different member. Thus, in the present embodiment, the shock absorbing performance can be improved by utilizing the in-plane shear rigidity of the upper surface 22a of the extension 22, and the thickness of the extension 22 can be decreased compared with a conventional case so that weight reduction and manufacturing cost reduction can be attained.

Yet further, in the present embodiment, the width dimension T1 along the vehicle upper/lower direction of the vertical wall of the inner member 30 and the width dimension T2 along the vehicle upper/lower direction of the vertical wall of the outer member 32, the inner member 30 and the outer member 32 forming the extension 22, are set to be different from each other, and it is thereby possible to make the pitches (wave widths) of the vehicle transverse inner and vehicle transverse outer buckling waveforms of the extension 22 different from each other. Thus, in the present embodiment, the shock absorbing performance can be improved by utilizing the in-plane shear rigidity of the upper surface 22a of the extension 22, and the thickness of the extension 22 can be decreased so that weight reduction and manufacturing cost reduction can be attained.

Still further, in the present embodiment, the inner notch 36a formed on the vehicle transverse inner wall (vertical wall) 30a of the inner member 30 on the vehicle transverse inner side and the outer notch 36b formed on the vehicle transverse outer wall (vertical wall) 32a of the outer member 32 on the vehicle transverse outer side are located at different positions along the vehicle longitudinal direction, and thereby the origin points of the buckling wave forms W1, W2, which are respectively on the vehicle transverse inner side and on the vehicle transverse outer side of the extensions 22, 22, are made different from each other so that inward falling of the entire extension 22 can be inhibited. Thus, in the present embodiment, it is possible to appropriately absorb a collision load, by axial crushing of the extension 22.

What is claimed is:

1. A vehicle body rear structure, comprising:
   plural frame members extending along a vehicle longitudinal direction; and
   shock absorbing members provided at positions corresponding to rear ends of the respective frame members,
   wherein the each shock absorbing member is formed such that plural corner portions provided at a rear end of the shock absorbing member are located at positions different from each other along the vehicle longitudinal direction,
   wherein the each shock absorbing member is formed by plural members superimposed on each other along a vehicle transverse direction,
   wherein the plural members includes respective extended portions extended from rear ends thereof toward an inner side of the shock absorbing member, and
   wherein superimposed parts formed by superimposing the extended portions on each other are joined from a vehicle rear.

2. The vehicle body rear structure according to claim 1,
   wherein the each shock absorbing member is arranged such that a closed cross-section is formed by superimposing plural C-shaped members substantially in a C-shape in a side view on each other along the vehicle transverse direction, and that a width dimension, along a vehicle upper/lower direction, of a vertical wall of a C-shaped vehicle transverse inner member and a width dimension, along a vehicle upper/lower direction, of a vertical wall of a C-shaped vehicle transverse outer member are different from each other.

3. The vehicle body rear structure according to claim 2,
   wherein the each shock absorbing member includes an inner notch formed on the vertical wall of the vehicle transverse inner member and extended along the vehicle upper/lower direction, and an outer notch formed on the vertical wall of the vehicle transverse outer member and extended along the vehicle upper/lower direction,
   and wherein the inner notch and the outer notch are located at different positions along the vehicle longitudinal direction.

* * * * *

UNITED STATES PATENT AND TRADEMARK OFFICE
CERTIFICATE OF CORRECTION

PATENT NO. : 8,888,151 B2
APPLICATION NO. : 13/897665
DATED : November 18, 2014
INVENTOR(S) : Masakazu Kashiwagi et al.

It is certified that error appears in the above-identified patent and that said Letters Patent is hereby corrected as shown below:

On the title page, insert

--(30) Foreign Application Priority Data

May 22, 2012....(JP).........2012-116308--.

Signed and Sealed this
Fourteenth Day of April, 2015

Michelle K. Lee
*Director of the United States Patent and Trademark Office*